US010724692B2

(12) United States Patent
Dodo et al.

(10) Patent No.: US 10,724,692 B2
(45) Date of Patent: Jul. 28, 2020

(54) LIGHT SOURCE UNIT

(71) Applicant: USHIO DENKI KABUSHIKI KAISHA, Tokyo (JP)

(72) Inventors: Yukitaka Dodo, Tokyo (JP); Koji Ono, Tokyo (JP); Shinji Shimomura, Tokyo (JP); Ichiro Shibagaki, Tokyo (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/077,687

(22) PCT Filed: Jan. 31, 2017

(86) PCT No.: PCT/JP2017/003306
§ 371 (c)(1),
(2) Date: Aug. 13, 2018

(87) PCT Pub. No.: WO2017/141687
PCT Pub. Date: Aug. 24, 2017

(65) Prior Publication Data
US 2019/0072240 A1 Mar. 7, 2019

(30) Foreign Application Priority Data

Feb. 15, 2016 (JP) .................. 2016-025513

(51) Int. Cl.
F21K 9/60 (2016.01)
F21K 9/69 (2016.01)
(Continued)

(52) U.S. Cl.
CPC .............. F21K 9/60 (2016.08); F21K 9/69 (2016.08); F21V 5/04 (2013.01); F21V 7/0091 (2013.01);
(Continued)

(58) Field of Classification Search
CPC ..... F21K 9/60; F21V 5/04; F21V 7/04; G02B 27/0955; G02B 27/0977
See application file for complete search history.

(56) References Cited

U.S. PATENT DOCUMENTS 1,389,291 A * 8/1921 Bone ..................... F21S 41/689
362/280
4,651,257 A * 3/1987 Gehly ...................... F21V 7/09
362/241

(Continued)

FOREIGN PATENT DOCUMENTS

CA     2 588 733 A1    6/2006
JP    2007-048883 A   2/2007
(Continued)

OTHER PUBLICATIONS

International Search Report issued in PCT/JP2017/003306; dated Apr. 25, 2017.
(Continued)

Primary Examiner — Isiaka O Akanbi
Assistant Examiner — Nathaniel J Lee
(74) Attorney, Agent, or Firm — Studebaker & Brackett PC

(57) ABSTRACT

A light source unit includes a light distribution lens configured to guide light emitted from an LED disposed behind the light distribution lens, and a reflector arranged to surround the light distribution lens. Illuminance unevenness can be more suitably reduced, and effective light is not blocked even if a pinhole device is used for glare prevention, thereby avoiding illuminance unevenness and illuminance reductions. The light distribution lens has a columnar part that extends in the optical axis direction, and a conical recess is formed in the distal end of the columnar part. The conical recess is constituted by a reflective surface that fully reflects, in the circumferential direction, light incident on the light (Continued)

distribution lens. The reflector reflects light emitted from a cylindrical side surface of the columnar part such that the reflected light becomes converging light.

19 Claims, 4 Drawing Sheets

(51) Int. Cl.
| | |
|---|---|
| *F21V 7/00* | (2006.01) |
| *F21V 13/04* | (2006.01) |
| *F21V 5/04* | (2006.01) |
| *F21V 7/04* | (2006.01) |
| *G02B 27/09* | (2006.01) |
| *F21Y 115/10* | (2016.01) |

(52) U.S. Cl.
CPC ............... *F21V 7/04* (2013.01); *F21V 13/04* (2013.01); *G02B 27/0955* (2013.01); *G02B 27/0977* (2013.01); *F21V 7/0008* (2013.01); *F21V 7/0041* (2013.01); *F21Y 2115/10* (2016.08)

(56) References Cited

U.S. PATENT DOCUMENTS

| | | | |
|---|---|---|---|
| 2006/0193137 A1* | 8/2006 | Chinniah | F21S 41/141 |
| | | | 362/326 |
| 2008/0278961 A1 | 11/2008 | Cunnien | |
| 2015/0062882 A1* | 3/2015 | Hsu | F21V 13/04 |
| | | | 362/183 |
| 2016/0341387 A1* | 11/2016 | Durand | F21S 41/285 |

FOREIGN PATENT DOCUMENTS

| | | |
|---|---|---|
| JP | 2008-522371 A | 6/2008 |
| JP | 2010-102913 A | 5/2010 |
| JP | 2010102913 A * | 5/2010 |
| JP | 2011-076955 A | 4/2011 |
| JP | 2012-234650 A | 11/2012 |
| JP | 2015-164098 A | 9/2015 |
| WO | 2006/060392 A2 | 6/2006 |

OTHER PUBLICATIONS

An Office Action; Japanese Patent Office dated Apr. 2, 2018, which corresponds to Japanese Patent Application No. 2016-025513.

* cited by examiner

LIGHT SOURCE UNIT

TECHNICAL FIELD

The present invention relates to a light source unit that irradiates a target surface with light emitted from a light emitting diode (LED).

BACKGROUND ART

Conventionally, a lighting device is used to cause light, which is emitted from a light emitting diode (LED), to reflect or refract using a reflecting mirror (reflector) or a lens, in order to irradiate a target surface with the light from the LED.

Such lighting device suffers from a fact that illuminance unevenness (often referred to as illumination irregularity or irradiation unevenness) occurs on a surface (plane) irradiated with the light. Various countermeasures are studied to suppress the illuminance unevenness.

For example, Japanese Patent Application Laid-Open Publication No. 2015-164098 (Patent Literature Document 1) discloses an arrangement that includes a light diffusing part disposed on or near the light exit surface of a lens, and another light diffusing part on a surface of a recess formed in the light exit surface, such that the light emitted from the LED uniformly diffuses, and the illuminance unevenness (illumination irregularity, or irradiation unevenness) on the surface irradiated with the light decreases.

In the field of general illumination, on the other hand, a person would be dazzled if the light having high luminance is present in the viewing angle of the person (such phenomenon is called glare). An environment, which frequently has glares, gives uncomfortableness to the person. Thus, countermeasures to suppress the generation of the glare are studied.

For example, Japanese Patent Application Laid-Open Publication No. 2010-102913 (Patent Literature Document 2) discloses an arrangement for a downlight lighting device, and a guide body (mechanism to block or shield the light in a wide angle) configured to suppress the glare is attached to the lighting device. This shields the emitted wide-angle light, which would otherwise enter the viewing angle of the person, and prevents the generation of the glare. A guide body that adjusts the shielding angle may be a shielding device having a pinhole shape (hereinafter referred to as a "pinhole device"), with an opening diameter being decreased.

LISTING OF REFERENCES

Patent Literature Documents

Patent Literature Document 1: Japanese Patent Application Laid-Open Publication No. 2015-164098
Patent Literature Document 2: Japanese Patent Application Laid-Open Publication No. 2010-102913

SUMMARY OF THE INVENTION

Problems to be Solved by the Invention

As shown in FIG. 6 of the accompanying drawings, however, the lighting device disclosed in Patent Literature Document 1 has a light diffusing part 53 on the light exit surface of a light distribution lens 52, which faces the LED 51, and also has a recess 54 in the middle of the light exit surface of the light distribution lens. This yields a step between the optical axis center area and its surrounding area. Thus, the balance of the light distribution is ensured, and the illuminance unevenness on the surface irradiated with the light is eliminated.

However, if a guide body (pinhole type or the like) 60 disclosed in Patent Literature Document 2 is attached to the above-described arrangement to suppress the generation of the glare, part of the effective irradiation light that no longer has illuminance unevenness is cut (shielded). This destroys the balance of the light distribution on the surface irradiated with the light. As a result, the illuminance unevenness is created again.

The structure of the guide body is appropriately altered depending upon the intended use (size of a desired area to be irradiated with the light) and/or the place of installation (constraints imposed by the installation). The degree of illuminance unevenness changes with the structure of the guide body. Therefore, if the configuration of the lens (feature of the light diffusing part and/or the shape of the recess) is not modified in accordance with the structure of the guide body for each time of installation, it is difficult to sufficiently irradiate the target surface with the light while suppressing the illuminance unevenness.

Also, when the guide body is attached or disposed, the light is partly shielded. This decreases an amount of light to be directed to the target surface, and deteriorates an efficiency of light utilization.

Considering the above-described problems of the prior art technologies, the present invention provides a light source unit that includes an LED, a light distribution lens and a reflector and that can more appropriately reduce the illuminance unevenness and does not shield the effective light even if the pinhole device is used for the glare prevention, thereby avoiding the illuminance unevenness and the illuminance deterioration on the surface irradiated with the light from the LED.

Solution to the Problems

In order to solve the above-described problems, one aspect of the present invention provides a light source unit that includes a light distribution lens configured to guide light emitted from an LED disposed behind the light distribution lens, and a reflector arranged to surround the light distribution lens. The light distribution lens has a columnar part (cylindrical part) that extends in an optical axis direction, and a conical recess is formed at a front end of the columnar part. The conical recess is constituted by a reflecting surface that totally and entirely reflects light, which is incident to the light distribution lens, in a lateral direction thereof. The reflector is configured to reflect the light, which exits from a cylindrical side wall of the columnar part, such that the reflected light becomes converging light.

The cylindrical side wall of the columnar part may have a decreasing diameter toward a front end of the columnar part.

The light distribution lens may have the columnar part and a planar part, and the reflector may be attached to the planar part.

A rear face of the light distribution lens may have a light incident surface that is convex toward the LED.

An annular groove may be provided around the light incident surface, and an outer annular surface of the annular groove may be constituted by an inclined plane.

Advantageous Effects of the Invention

The light source unit of the present invention includes the light distribution lens to guide the light emitted from the LED, the light distribution lens has the columnar part that extends in the optical axis direction, and the conical recess is formed at the front end of the columnar part. Therefore, the light emitted from the LED does not proceed directly forward from the light distribution lens, but is totally and entirely reflected by the conical recess at the front end of the light distribution lens such that the light proceeds laterally outward through the side wall of the columnar part. Then, the light is reflected by the reflector such that the reflected light converges at the focal point of the reflector. Accordingly, the light reflected by the reflector converges (concentrates) at the focal point of the reflector, and then spreads and reaches a target surface such that the target surface is irradiated with the spreading light. As such, even if a pinhole device is disposed in the vicinity of the light source unit to prevent the glare, it is possible to arrange the pinhole device without shielding the light obtained from the light source unit. Consequently, the light source unit provides advantages, i.e., the irradiation unevenness does not occur on the surface irradiated with the light from the light source unit, and an amount of light that reaches the target surface does not decrease.

DESCRIPTION OF EMBODIMENTS

Figure 1A:
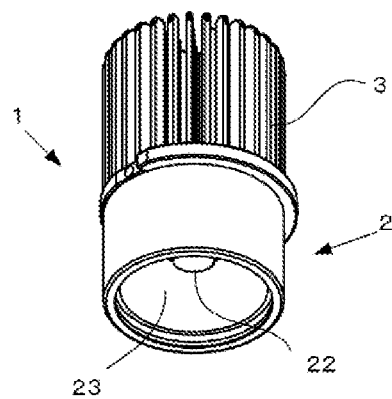
FIG. 1(A) is a perspective view of a lighting device that has a light source unit according to an embodiment of the present invention.
Figure 1B:
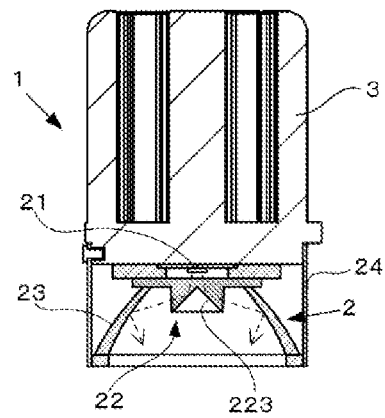
FIG. 1(B) is a cross-sectional view of the lighting device.

FIG. 1 is a set of views to show a lighting device that includes a light source unit according to an embodiment of the present invention. Specifically, FIG. 1(A) shows a perspective view from a lower position, and FIG. 1(B) shows a cross-sectional view. The lighting device 1 includes a light source unit 2, and a heat sink 3 disposed behind the light source unit.

The light source unit 2 has an LED 21, a light distribution lens 22, and a reflector 23. The LED, the light distribution lens, and the reflector are disposed in a cylindrical housing 24 attached to the heat sink 3.

Figure 2:
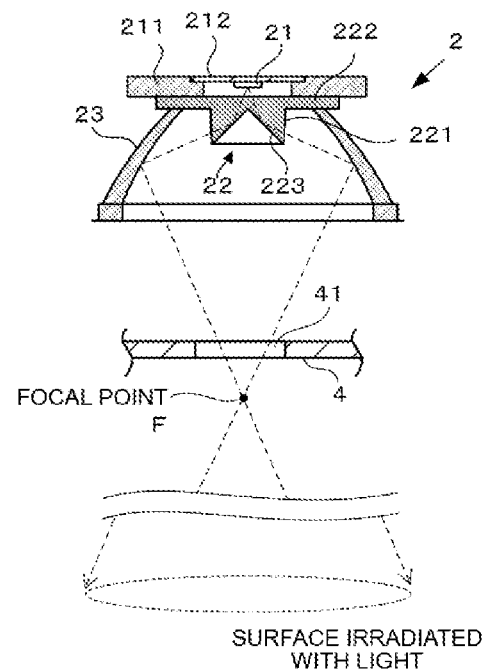
FIG. 2 shows the light source unit according to the embodiment of the present invention, together with an optical path of the light from the light source unit.

Referring also to FIG. 2, the LED 21 is mounted on a substrate 212 attached to a frame 211.

The light distribution lens 22, which is made from a light transmitting material, is attached to the frame 211. The light distribution lens 22 has a columnar part (cylindrical part) 221 that extends in an optical axis direction, and a planar part 222.

The columnar part 221 and the planar part 222 may be formed integrally as a one-piece element, or may originally be provided as separate elements and joined together later.

At the front end (distal end) of the columnar part 221 along the optical axis, formed is a conical recess 223. The conical recess 223 is constituted by a reflecting surface that totally and entirely reflects the light incident to the light distribution lens 22 from the LED 21 disposed behind the light distribution lens, without allowing the light to directly proceed forward from the front end of the columnar part 22.

The reflector 23, which is the elliptical mirror, is attached to the planar part 222 of the light distribution lens 22.

The reflector 23 reflects the light, which has exited from the columnar part 221 of the light distribution lens 22 in the radially outward direction (lateral direction) of the columnar part 221 through the side wall of the columnar part 221, and causes the light to condense (converge) at a focal point F of the reflector 23.

It should be noted that the cross-sectional shape of the columnar part 221 of the light distribution lens 22 (shape of the cylindrical side wall) may be defined by straight lines or curve lines. Similarly, the cross-sectional shape of the conical recess 223 may be defined by straight lines or curve lines.

The optical path of the light from the LED 21 is shown in FIG. 2.

The light emitted from the LED 21 is incident to the light distribution lens 22, and totally and entirely reflected by the conical recess 223 formed at the distal end of the columnar part 221 such that the light proceeds laterally outward through the cylindrical side wall (cylindrical surface) of the columnar part 221. Then, the light penetrating the cylindrical wall of the columnar part is reflected by the reflector 23, and converged to the focal point F, which is present forward of the reflector 23. Passing the focal point, the light spreads and proceeds to the target surface S to be irradiated (hereinafter, the above-described irradiation may be referred to as cross irradiation because the above-described irradiation causes the light to firstly converge and then spread (expand), before the light reaches the target surface to be irradiated).

With such arrangement, as shown in FIG. 2, if the pinhole device 4 is disposed to prevent the glare, the pinhole device is disposed such that the pinhole 41 is situated in the vicinity of the focal point F. Consequently, the converging light passes through the pinhole 41, and the effective light is not shielded (blocked) by the pinhole device. As such, whether or not the pinhole device 4 is present, problems such as the irradiation unevenness on the irradiation surface (target surface) and the illuminance deterioration would not occur.

Figure 3:
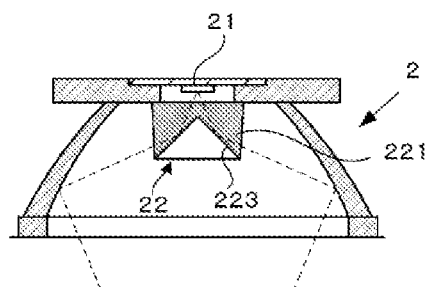
FIG. 3 is a cross-sectional view of another embodiment of the present invention.

FIG. 3 illustrates another embodiment of the distribution lens 22. The distribution lens 22 has a generally columnar shape. Similar to the embodiment shown in FIGS. 1 and 2, the conical recess 223 is formed at the front end of the distribution lens.

Figure 4:
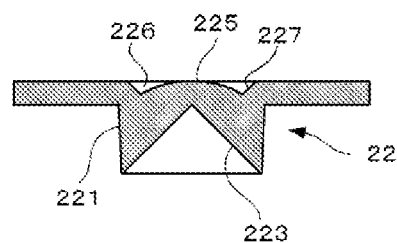
FIG. 4 is a cross-sectional view of still another embodiment.

FIG. 4 illustrates still another embodiment of the distribution lens 22. The distribution lens 22 has a light incident surface 225 on that surface (rear face) which faces the LED. The light incident surface is convex, and protrudes toward the LED. An annular groove 226 is formed around the light incident surface 225, and an outer annular surface 227 of the groove is constituted by an inclined plane.

The light incident surface 225 having the convex shape causes the light from the LED to converge (concentrate) toward the conical recess 223, and the light is efficiently reflected by the recess.

Now, an example of the light distribution lens 22 that is configured according to the embodiment shown in FIG. 4 will be described in detail with reference to FIG. 5 that shows an enlarged view.

The conical recess 223 formed at the front end of the columnar part 221 of the distribution lens 22 is constituted by the reflecting surface having an apex angle θ1 to totally and entirely reflect the light introduced to the distribution lens 22 from the LED 21. The light from the LED 21 does not proceed straight through the front end (distal end) of the columnar part 221, but the light is reflected by the conical recess 223 such that the light proceeds laterally outward from the side wall (side face) of the columnar part 221.

The columnar part 221 may have a tapered shape (tapered portion) whose diameter slightly decreases toward the front end thereof along the optical axis. The beam diameter of the reflected light becomes smaller as the angle θ2, which the cylindrical side wall (normal or vertical surface) of the columnar part 221 makes with a plane perpendicular to the optical axis, is closer to the right angle (90 degrees). Thus, the area irradiated with the reflected light becomes smaller as the angle θ2 is closer to 90 degrees. When the angle θ2 is set to be large, the beam diameter increases, and the area irradiated with the reflected light on the target irradiation surface becomes larger. Thus, the angle of inclination of the side wall is suitably decided depending upon the size of a desired target irradiation area (effective irradiation region).

With regard to the light emitted from the LED 21, the annular groove 226 formed around the light incident surface 225 reduces an amount of light that directly proceeds to the reflecting surface of the reflector 23 from the LED 21 without passing through the conical recess 223. The outer annular surface 227 of the annular groove 226 is constituted by an inclined surface whose diameter is reduced toward the front along the optical axis.

The inclined outer surface 227 of the annular groove 226 reflects or refracts the light that is emitted from the LED 21 and would otherwise directly proceed to the reflector 23 without passing through the conical recess 223 of the columnar part 221. The inclined outer surface 227 causes such light to proceed toward the conical recess 223 by reflection or refraction. Thus, it is possible to reduce an amount of stray light that proceeds without passing the conical recess 223. This suppresses the irradiation unevenness on the target irradiation surface.

Preferably, the angle (θ3) of the inclined outer surface 227 is designed to be in a range between 90 degrees and 135 degrees. Preferably, the angle of inclination (θ3) is designed such that the angle of inclination (θ3) depends upon the beam angle of the light emitted from the LED 21, and increases as the beam angle increases. This ensures that the light distribution unevenness is suitably reduced on the basis of the beam angle.

Preferably, the size (diameter) D4 of the light incident surface 225 is smaller than the opening diameter D3 of the conical recess 223 (D4<D3). This easily restricts the light that directly proceeds to the reflector, and reduces the stray light. On the other hand, if the diameter D4 of the light incident surface 225 is relatively large, an amount of light that directly proceeds to the reflector from the LED 21 without passing the conical recess 223 increases, and this results in the illuminance unevenness.

Figure 5:
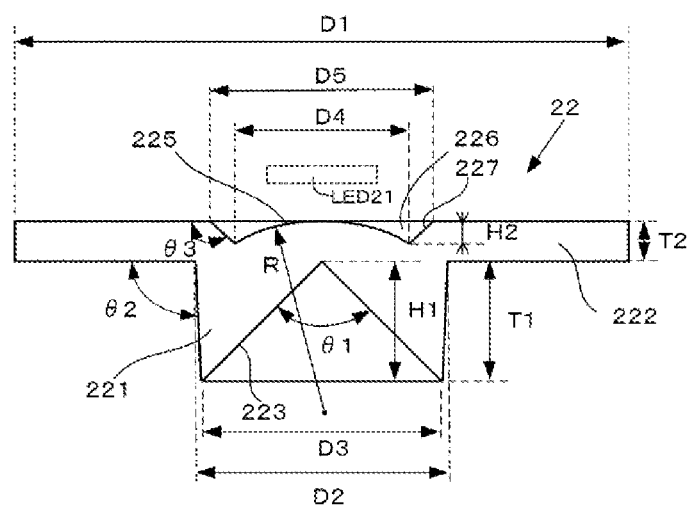
FIG. 5 is an enlarged and detailed cross-sectional view of the embodiment shown in FIG. 4.
Figure 6:
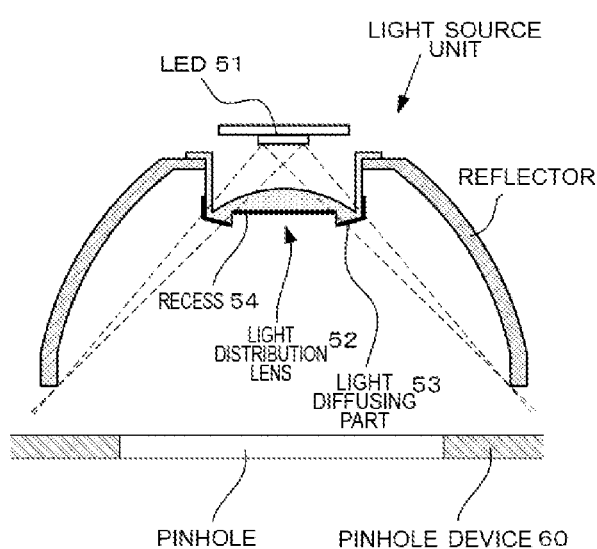
FIG. 6 is a cross-sectional view of a conventional light source unit.

A numerical example of the light distribution lens 22 having the structure shown in FIG. 5 is indicated below.

Planar part: Diameter (D1) φ28.9 mm, thickness (T2) 2.5 mm

Columnar part: Diameter (D2) φ16.4 mm, length (T1) 7.6 mm, normal plane angle (θ2) 99 degrees Conical recess: Opening diameter (D3) φ14 mm, depth (H1) 6.6 mm, apex angle (θ1) 90 degrees Light incident surface: Convex shape, radius of curvature (R) 44 mm, diameter (D4) φ11.3 mm Annular groove: Outer diameter (D5) φ16 mm, depth (H2) 1.7 mm, angle of the inclined surface (θ3) 145 degrees As described above, the exemplary light source unit of the present invention includes the light distribution lens arranged to face the LED, the light distribution lens has the columnar part, and the conical recess is formed at the front end of the columnar part. Therefore, the light introduced to the light distribution lens from the LED is totally and entirely reflected by the conical recess at the front end of the light distribution lens, without proceeding directly forward (straight) from the front end of the light distribution lens. Thus, the light from the LED proceeds laterally outward from the cylindrical side wall of the columnar part and reaches the reflector. Then, the light is reflected by the reflector and becomes converging (concentrating) light. Subsequently, the light spreads and arrives at the target irradiation surface (cross irradiation).

As such, even if the pinhole device is used together with the above-described light source unit in order to prevent the glare, the effective irradiation light from the light source unit is never shielded by the pinhole device when the pinhole is situated in a light converging area. Therefore, the light source unit has the outstanding advantages, i.e., it does not cause the irradiation unevenness on the surface irradiated with the light, and does not decrease the illuminance.

REFERENCE NUMERALS AND SYMBOLS

1: Lighting device
2: Light source unit
21: LED
211: Frame
212: Substrate
22: Light distribution lens
221: Columnar part
222: Planar part
223: Conical recess
225: Light incident surface
226: Annular groove
227: Inclined outer surface
23: Reflector
3: Heat sink
4: Pinhole device
41: Pinhole

The invention claimed is:

1. A light source unit comprising:
a light distribution lens configured to guide light emitted from an LED disposed behind the light distribution lens;
a reflector arranged to surround the light distribution lens; and
a glare prevention member disposed in front of the light distribution lens to prevent glare caused by light reflected by the reflector,
the light distribution lens having a columnar part that extends in an optical axis direction, and a conical recess formed at a front end of the columnar part,
the conical recess being constituted by a reflecting surface that totally and entirely reflects light, which is incident to the light distribution lens from the LED, in a lateral direction thereof,
the reflector configured to reflect the light, which exits from a cylindrical side wall of the columnar part, such that the reflected light becomes converging light, and
the glare prevention member having an opening that allows an entirety of the converging light to pass through the opening.

2. The light source unit according to claim 1, wherein the cylindrical side wall of the columnar part has a decreasing diameter toward the front end of the columnar part.

3. The light source unit according to claim 2, wherein the light distribution lens has the columnar part and a planar part, and the reflector is attached to the planar part.

4. The light source unit according to claim 2, wherein a rear face of the light distribution lens has a light incident surface that is convex toward the LED.

5. The light source unit according to claim 4, wherein an annular groove is provided around the light incident surface, and an outer annular surface of the annular groove is constituted by an inclined plane.

6. The light source unit according to claim 5, wherein the annular groove reduces an amount of light that directly proceeds to a light reflecting surface of the reflector from the LED without passing through the conical recess.

7. The light source unit according to claim 1, wherein the light distribution lens has the columnar part and a planar part, and the reflector is attached to the planar part.

8. The light source unit according to claim 7, wherein a rear face of the light distribution lens has a light incident surface that is convex toward the LED.

9. The light source unit according to claim 8, wherein an annular groove is provided around the light incident surface, and an outer annular surface of the annular groove is constituted by an inclined plane.

10. The light source unit according to claim 9, wherein the annular groove reduces an amount of light that directly proceeds to a light reflecting surface of the reflector from the LED without passing through the conical recess.

11. The light source unit according to claim 1, wherein a rear face of the light distribution lens has a light incident surface that is convex toward the LED.

12. The light source unit according to claim 11, wherein an annular groove is provided around the light incident surface, and an outer annular surface of the annular groove is constituted by an inclined plane.

13. The light source unit according to claim 11, wherein a diameter of the light incident surface is smaller than a diameter of an opening of the conical recess.

14. The light source unit according to claim 12, wherein the annular groove reduces an amount of light that directly proceeds to a light reflecting surface of the reflector from the LED without passing through the conical recess.

15. The light source unit according to claim 1, wherein the reflector includes an elliptical mirror.

16. The light source unit according to claim 1, wherein the light reflected by the reflector converges at a focal point of the reflector, and spreads and reaches at a target surface to be irradiated with the light of the light source unit.

17. The light source unit according to claim 1, wherein the light glare prevention member is a pinhole device that has a pinhole such that the entirety of the converging light passes through the pinhole.

18. The light source unit according to claim 17, wherein the converging light converges at a focal point of the reflector after passing through the pinhole, and the light spreads and reaches at a target surface to be irradiated with the light of the light source unit.

19. The light source unit according to claim 1, wherein a focal point of the reflector is present between the glare prevention member and an object to be irradiated with the light having passed through the glare prevention member.

* * * * *